(12) United States Patent  (10) Patent No.: US 8,529,822 B2
Chung et al.  (45) Date of Patent: Sep. 10, 2013

(54) METHOD FOR MANUFACTURING A FLEXIBLE OPTICAL PLATE, PRODUCT AND BACKLIGHT MODULE MADE THEREWITH

(75) Inventors: Chen-Kuei Chung, Tainan (TW); Chih-Ching Cheng, Tainan (TW); Shih-Lung Lin, Tainan (TW); Yuan-Jie Syu, Tainan (TW); Kun-Lin Sher, Tainan (TW)

(73) Assignee: National Cheng Kung University, Tainan (TW)

( * ) Notice: Subject to any disclaimer, the term of this patent is extended or adjusted under 35 U.S.C. 154(b) by 131 days.

(21) Appl. No.: 13/187,083

(22) Filed: Jul. 20, 2011

(65) Prior Publication Data

US 2012/0020111 A1   Jan. 26, 2012

(30) Foreign Application Priority Data

Jul. 20, 2010   (TW) ............................... 99123834 A

(51) Int. Cl.
*B29C 35/08*   (2006.01)
*B29D 21/00*   (2006.01)

(52) U.S. Cl.
USPC ........... 264/400; 264/1.24; 428/141; 362/607

(58) Field of Classification Search
USPC ................. 362/607; 428/141; 264/1.24, 400
See application file for complete search history.

(56) References Cited

U.S. PATENT DOCUMENTS

| 5,438,204 A * | 8/1995 | von Bunau et al. ........ 250/492.2 |
| 5,607,821 A * | 3/1997 | Haruki et al. .................. 430/396 |
| 6,673,526 B1 * | 1/2004 | Ogawa et al. .................. 430/396 |
| 2006/0197930 A1 * | 9/2006 | Kawashima et al. ........... 355/55 |
| 2009/0097228 A1 * | 4/2009 | Ha et al. ........................ 362/97.1 |

FOREIGN PATENT DOCUMENTS

| CN | 1136792 A | 11/1996 |
| CN | 101161400 A | 4/2008 |
| CN | 101371074 A | 2/2009 |
| CN | 101398507 A | 4/2009 |
| TW | 294430 | 3/2008 |

* cited by examiner

*Primary Examiner* — Ali Alavi

(74) *Attorney, Agent, or Firm* — Ditthavong Mori & Steiner, P.C.

(57) ABSTRACT

A method for manufacturing a flexible optical plate includes steps of: (A) positioning a metallic mask on a surface of a mother substrate; (B) irradiating a carbon dioxide laser beam through the metallic mask to form cavities on the surface of the mother substrate; (C) coating a polymer material on the surface of the mother substrate to fill the cavities; and (D) drying the coated polymer material to form the flexible optical plate, the flexible optical plate having a substrate on the surface of the mother substrate and microstructures protruding from the substrate and each corresponding to one of the cavities.

5 Claims, 9 Drawing Sheets

METHOD FOR MANUFACTURING A FLEXIBLE OPTICAL PLATE, PRODUCT AND BACKLIGHT MODULE MADE THEREWITH

FIELD OF THE INVENTION

The invention relates to a method for manufacturing a flexible optical plate, a product made and a backlight module made with the method.

BACKGROUND OF THE INVENTION

Current electronic devices are designed to become more and more user-friendly. Furthermore, in order to cope with different circumstances, transportability and flexibility are elements inevitable for the design of such electronic devices.

Usually, a display contains numerous functions, such as a light guiding plate and a diffusion plate. For instance, a light guiding plate has a microstructure protruding from its surface for uniform light guide. Commonly, the microstructure in the optical plate is manufactured by lithography. Taiwan Patent No. I294430 discloses a method for manufacturing such an optical plate, and the method is described below. Firstly, a resist layer is coated on a surface of a substrate. Light is irradiated through a mask to expose the resist layer, and the exposed resist layer is then developed and baked to form a microstructure thereon. After coating a conducting layer on the resist layer, a core insert having a microstructure is electroformed on the conducting layer. Finally, the core insert is used to form the optical plate by injection molding. Since the foregoing lithography patterning includes steps of coating, soft baking, exposing, post baking, developing and hard baking, etc., the method is complicated.

Such an optical plate may be manufactured by another method to define its microstructure. In this method, a laser beam is irradiated onto a core insert to form a cavity thereon, and the core insert is then used to form the optical plate by casting or injection molding. Taking a carbon dioxide laser beam as an example, the carbon dioxide laser beam heats up a workpiece surface according to photothermal effect, and the heat is then conducted into the workpiece. When the heat energy is large enough, a part of the workpiece may be melted or vaporized. Then, the carbon dioxide laser beam scans the workpiece for photolithography or cutting the workpiece. As the carbon dioxide laser beam has a wavelength of approximately 10.6 µm, it's suitable for working on a brittle material, e.g. glass, polymer or oxide.

The carbon dioxide laser beam reaches the foregoing objective such as photolithography or cutting through photothermal effect. Owing to photothermal effect, the heat conducted internally in the workpiece causes the so called heat-affected zone in the workpiece, which leads to defects thereon, e.g. bulges, scorch, resolidification and splashes formation. On the other hand, when the optical plate is employed as a light guiding plate, its microstructure has a size of approximately 100 µm, and it's well known that the resolution of the optical plate can be improved by decreasing the size of the microstructure. However, a microstructure defined by the carbon dioxide laser beam has a size in a range from 200 to 300 µm. Therefore, the carbon dioxide laser beam cannot be used to define a microstructure having a size less than 100 µm. In sum, the carbon dioxide laser beam has disadvantages that the microstructure so made is oversized and thus the optical plate is defected. As such, the carbon dioxide laser beam is disadvantageous in manufacturing an optical plate having a microstructure, such as a light guiding plate.

SUMMARY OF THE INVENTION

An object of the invention is to provide a method for manufacturing a flexible optical plate, which is simple, and has low cost and less defect.

Therefore, the method comprises:

(A) positioning a metallic mask on a surface of a mother substrate;

(B) irradiating a carbon dioxide laser beam through the metallic mask to form cavities on the surface of the mother substrate;

(C) coating a polymer material on the surface of the mother substrate to fill the cavities; and (D) drying the coated polymer material to form the flexible optical plate, the flexible optical plate having a substrate on the surface of the mother substrate and microstructures protruding from the substrate and each corresponding to one of the cavities.

With the scope of the invention also is a flexible optical plate manufactured by the prementioned method.

The flexible optical plate comprises a substrate and microstructures.

The substrate is made of a polymer material and has a transparent surface.

The microstructures integrally protrude from the transparent surface of the substrate and each has a hemline having a size less than 100 µm on the transparent surface.

With the scope of the invention further is a backlight module.

The backlight module comprises a flexible optical plate, a light element and two reflectors.

The flexible optical plate is employed as a light guiding plate and comprises a substrate and microstructures. The substrate is made of a polymer material and has a transparent surface. The microstructures integrally protrude from the transparent surface of the substrate and each has a hemline having a size less than 100 µm on the transparent surface.

The light element is to emit light into the substrate.

The reflectors are mounted near an edge of the flexible optical plate and respectively on two opposite sides of the flexible optical plate whereby the light emitted by the light element is reflected to the flexible optical plate.

DETAILED DESCRIPTION OF THE INVENTION

Other features and advantages of the invention will become apparent in the following detailed description of a preferred embodiment with reference to the accompanying drawings.

Figure 1:
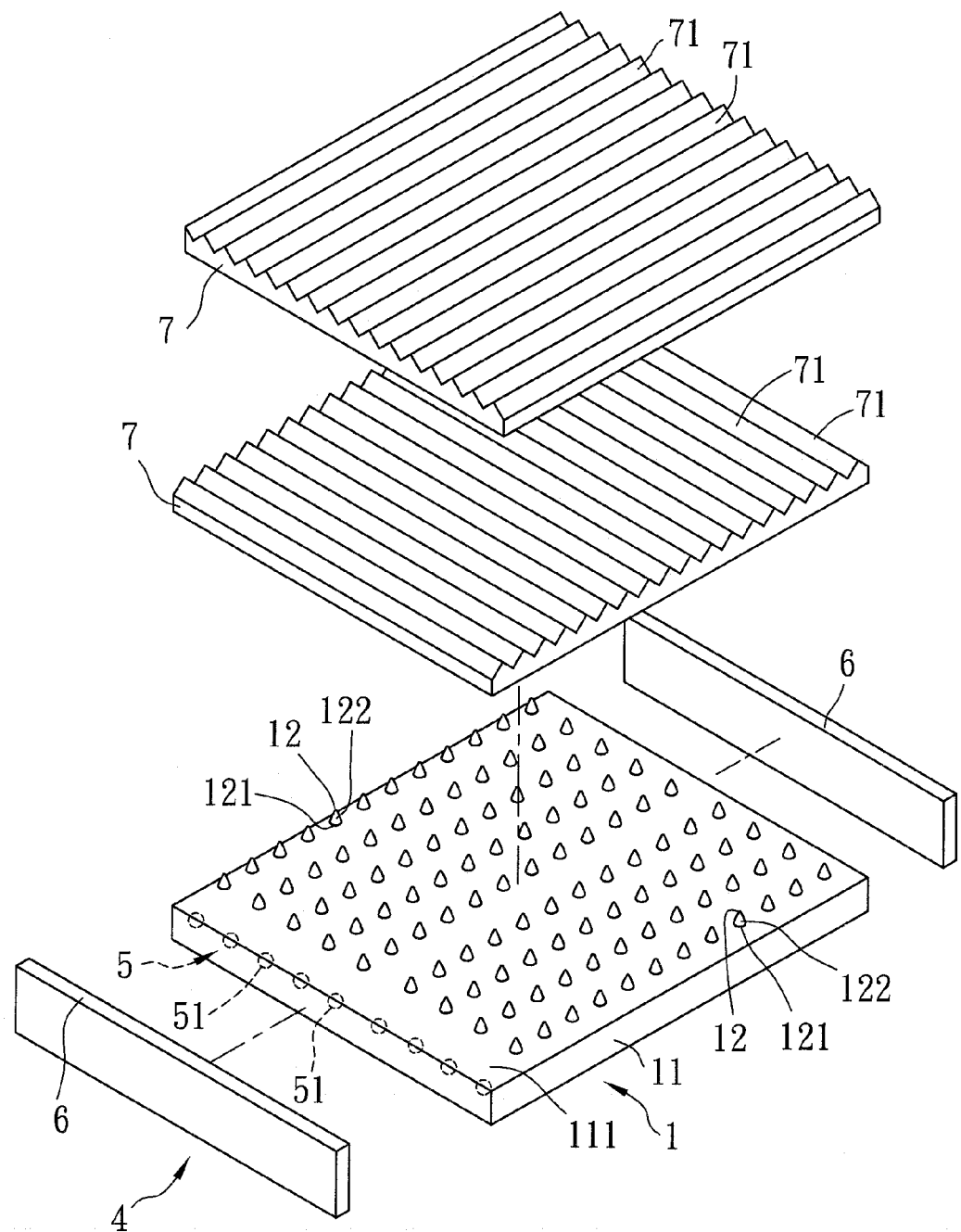
FIG. 1 is an exploded perspective view to illustrate a preferred embodiment of a backlight module in accordance with the invention.
Figure 2:
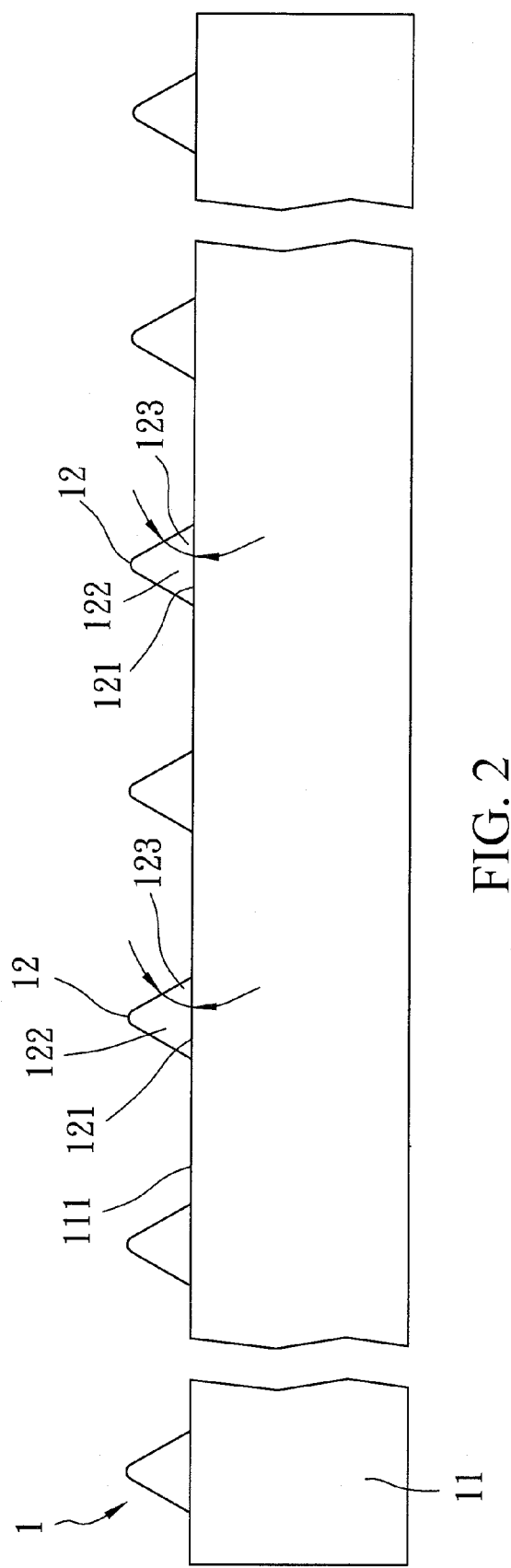
FIG. 2 is a cross-section view to illustrate a flexible optical plate of the backlight module shown in FIG. 1.

As shown in FIGS. 1 to 2, a preferred embodiment of a backlight module (4) in accordance with the invention is for use to provide uniform plain-surface light with a display panel, and comprises a flexible optical plate (1), a light element (5), two reflectors (6) and two brightness enhancement films (7) each having a prism structure (71).

In the preferred embodiment, the flexible optical plate (1) is employed as a light guiding plate and comprises a substrate (11) and microstructures (12) formed on the substrate (11). The substrate (11) has a transparent surface (111). The microstructures (12) integrally protrude from the transparent surface (111) to form a plane outline. Each of the microstructures (12) has a hemline (121) formed approximately in a circular shape on the transparent surface (111), an upward tapered microstructure (122) extending from the hemline (121), and a tilt angle (123) between the transparent surface (111) and the tapered microstructure (122). In the preferred embodiment, the microstructures (12) are in a conical shape, but may be in a hemispheric shape in another possible embodiment. In the preferred embodiment, the hemline (121) has a size of approximately 50 μm. Since the hemline (121) is in a circular shape, the "size" means the diameter of the hemline (121). In the preferred embodiment, the tilt angle (123) is in approximately 30 degrees.

It's noticeable that the microstructures (12) are arranged to form an array in the preferred embodiment, but may be arranged to form other patterns to increase illumination uniformity of the flexible optical plate (1). In the invention, the "illumination uniformity" is calculated as below. Firstly, the flexible optical plate (1) is divided into nine sections, and brightness (unit: nit=$cd/m^2$) of every section is measured. Finally, the illumination uniformity is obtained according to the ratio of the minimum of the brightness to the maximum of that. If the illumination uniformity is closer to 1, the flexible optical plate (1) has a better ability to guide light.

The substrate (11) and the microstructures (12) are made of a polymer material, such as, but not limited to, polydimethylsiloxane or parylene.

In the preferred embodiment, the light element (5) is mounted inside the substrate (11) to emit light into the substrate (11), and composed of a light emitting diode (LED). In another possible embodiment, the light element (5) may be mounted outside the substrate (11).

In the preferred embodiment, the reflectors (6) are respectively mounted on two opposite sides of the flexible optical plate (1) and one of them is near the light element (5). However, the number of the reflectors (6) is not limited to two. An example of the number may be four, and the four reflectors (6) surround an edge of the flexible optical plate (1).

In the preferred embodiment, the brightness enhancement films (7) overlap each other, and are mounted near a side facing the microstructures (12) of the flexible optical plate (1). The prism structure (71) of the brightness enhancement film (7) has an extension direction perpendicular to the other one for light concentration.

It's noticeable that the light emitted by the light element (5) is diffused in the flexible optical plate (1). Part of the light is irradiated away from the flexible optical plate (1) to the reflectors (6). Then the light is reflected back to the flexible optical plate (1) and to the brightness enhancement films (7). However, other part of the light directly runs through the transparent surface (111) and is irradiated away from the flexible optical plate (1) to the brightness enhancement films (7) according to light guide and diffusion by the microstructures (12). At the time, the light is concentrated by the prism structures (71) of the brightness enhancement films (7) to be irradiated to a direction away from the flexible optical plate (1) (the direction is upward in the preferred embodiment).

It's further noticeable that because the microstructures (12) of the flexible optical plate (1) are for use to guide and diffuse light, and the brightness enhancement films (7) are for use to enhance brightness of the light, the backlight module (4) still reach the purpose of providing uniform plain-surface light as the brightness enhancement films (7) are left out. The light element (5), the reflectors (6) and the brightness enhancement films (7) are not the critical elements in the invention, and they need no further description here.

As shown in FIGS. 3(a) to 3(e), a method for manufacturing a flexible optical plate is for use to produce the foregoing flexible optical plate (1) and comprises the following steps.

Figure 3A:
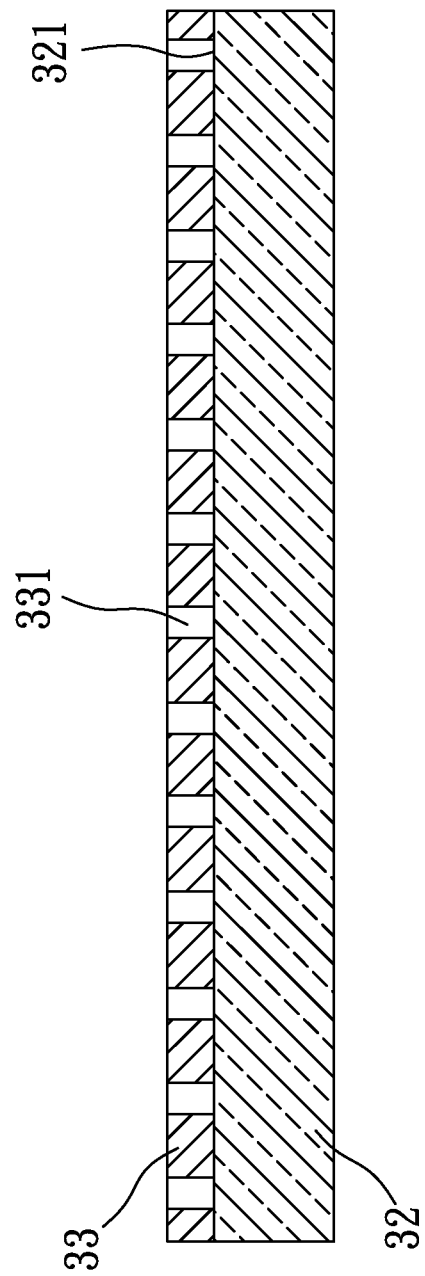
FIGS. 3(a) to 3(e) are cross-section views to illustrate a preferred embodiment of a method for manufacturing a flexible optical plate in accordance with the invention.

Referring to FIG. 3(a), a mother substrate (32) made of a polymer material, such as polymethyl methacrylate, is provided, and a metallic mask (33) which has shading ability is positioned on a surface (321) of the mother substrate (32). The metallic mask (33) has through holes (331) arranged to form an array and each having a size of 50 μm.

In the preferred embodiment, the material of the mother substrate (32) is not limited to the polymer material, and an example of the material may be a brittle nonsilicon material. In the preferred embodiment, the metallic mask (33) is made of SUS-304 stainless steel, but the shape, the size and the arrangement pattern of the through holes (331) are not limited as above. In another possible embodiment, the through holes (331) may be arranged to form any shape.

Figure 3B:
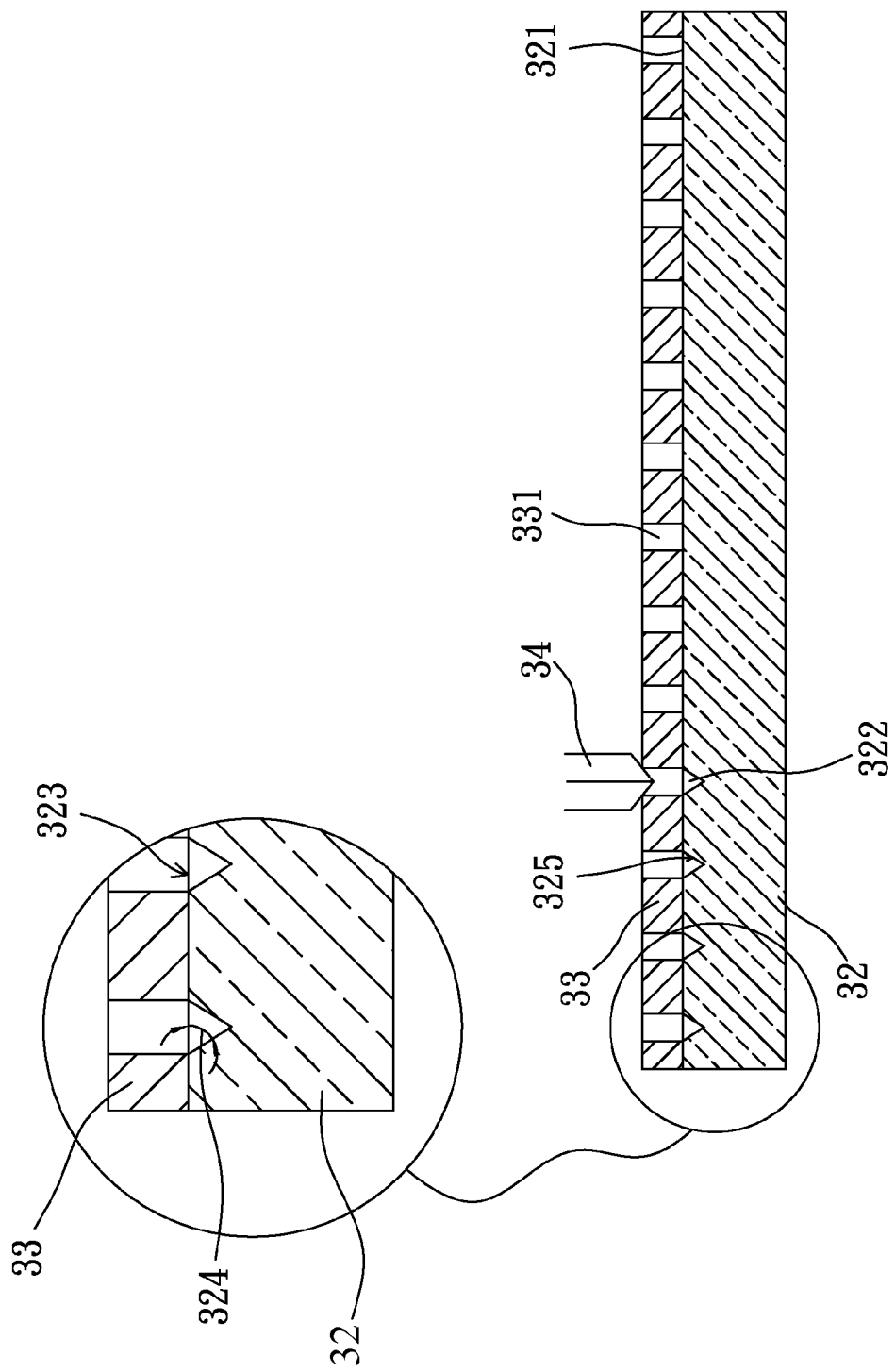

Referring to FIG. 3(b), a carbon dioxide laser beam (34) is irradiated to the surface (321) of the mother substrate (32) and scans the metallic mask (33) by appropriate output energy and speed of the carbon dioxide laser beam (34) to form concave walls (325) on the surface (321) of the mother substrate (32). The concave walls (325) define cavities (322) each having an upward opening (323) corresponding to one of the through holes (331). Moreover, the output energy and speed of the carbon dioxide laser beam (34) is used to adjust a tilt angle (324) of the cavity (322). The "tilt angle (324)" means an angle between the concave wall (325) and the surface (321) of the mother substrate (32).

In the preferred embodiment, the carbon dioxide laser beam (34) has energy in Gaussian distribution and thus the cavities (322) are in a conical or hemispheric shape. Further, part of the carbon dioxide laser beam (34) is shaded or reflected by the metallic mask (33), and thus a size of the opening (323) is less than the spot size of the carbon dioxide laser beam (34) and less than 100 μm. In the preferred embodiment, the spot size of the carbon dioxide laser beam (34) is in 100 μm and the opening (323) corresponding to the metallic mask (33) on the surface (321) has a size of approximately 50 μm.

It is noticeable that the output energy and speed of the carbon dioxide laser beam (34) can be varied with the depth of the cavity (322), and the tilt angle (324) of the cavity (322) is formed when the opening (323) of the cavity (322) is in a constant size. Thus, the method in accordance with the invention has advantages that the size of the cavity (322) processed by the carbon dioxide laser beam (34) can reach to less than 100 μm and the tilt angle (324) of the cavity (322) can be adjusted.

Figure 3C:
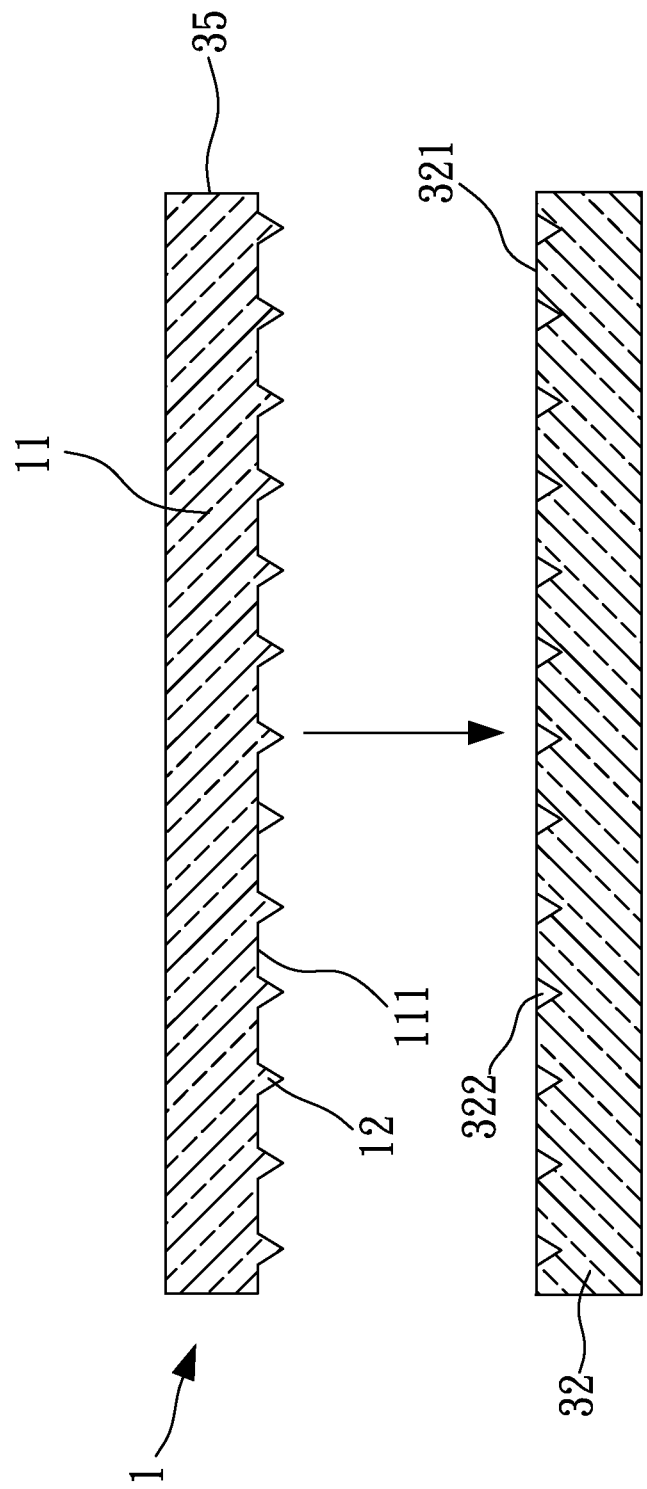

Referring to FIG. 3(c), after removing the metallic mask (33) from the mother substrate (32), a polymer material (35)

is uniformly coated on the surface (321) to fill the cavities (322). The polymer material (35) is plastic and flexible after formation.

In the preferred embodiment, the coated polymer material (35) is polydimethylsiloxane. However, the polymer material (35) coating is performed in a vacuum glove box to prevent bubble formation.

Figure 3D:
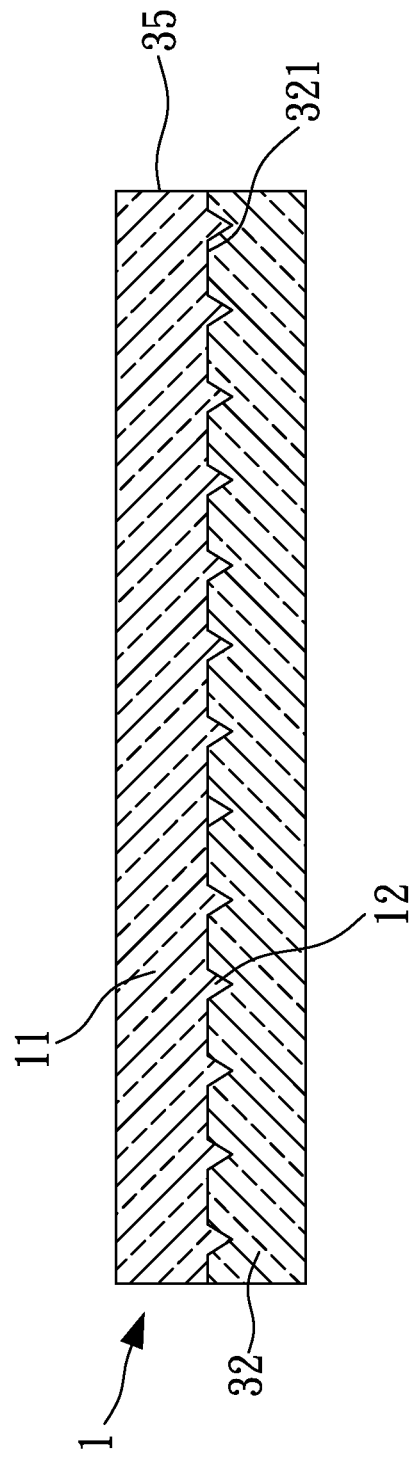

Referring to FIG. 3(d), the mother substrate (32) and the coated polymer material (35) on the surface (321) are baked in an oven at 80° C. for 40 minutes to dry the coated polymer material (35) and form a flexible optical plate (1) on the surface (321). At the time, the flexible optical plate (1) comprises a substrate (11) on the surface (321) and microstructures (12) protruding from the substrate (11) and each corresponding to one of the cavities (322).

Figure 3E:
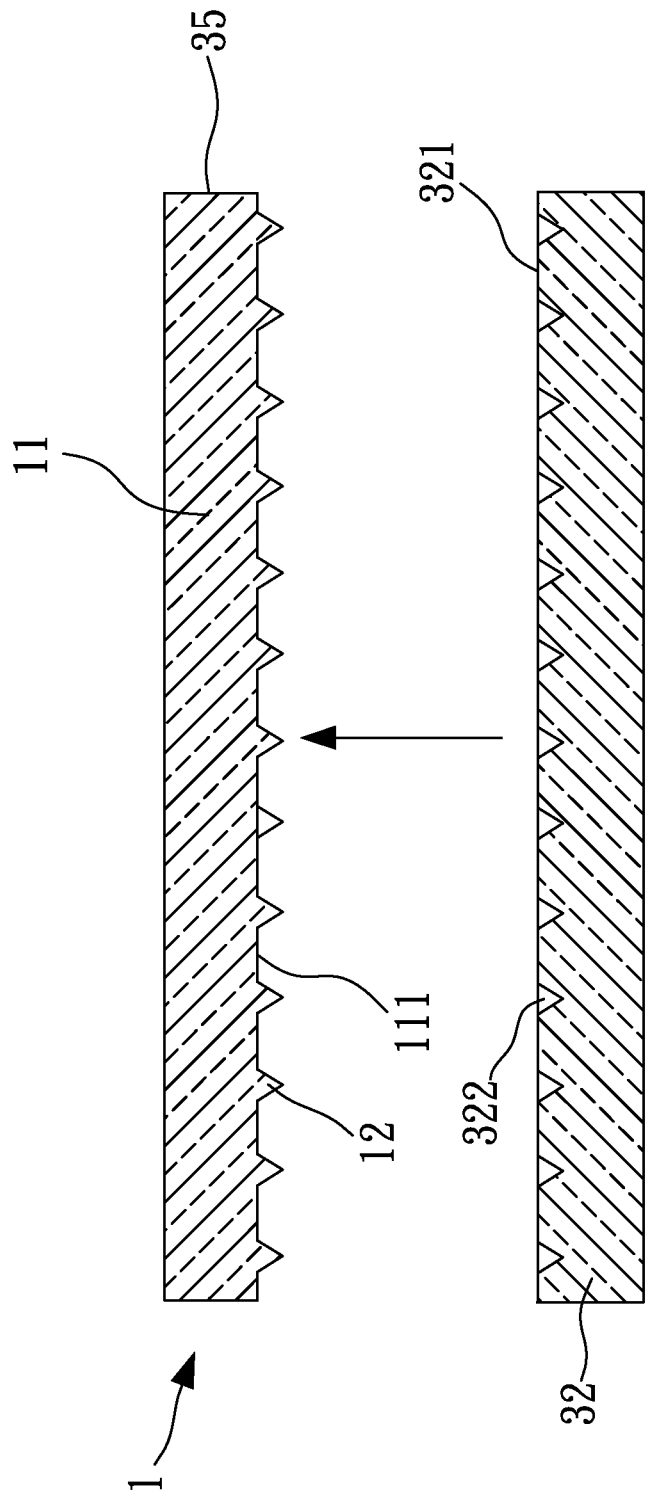

Referring to FIG. 3(e), the flexible optical plate (1) is removed from the surface (321) of the mother substrate (32).

Figure 4:
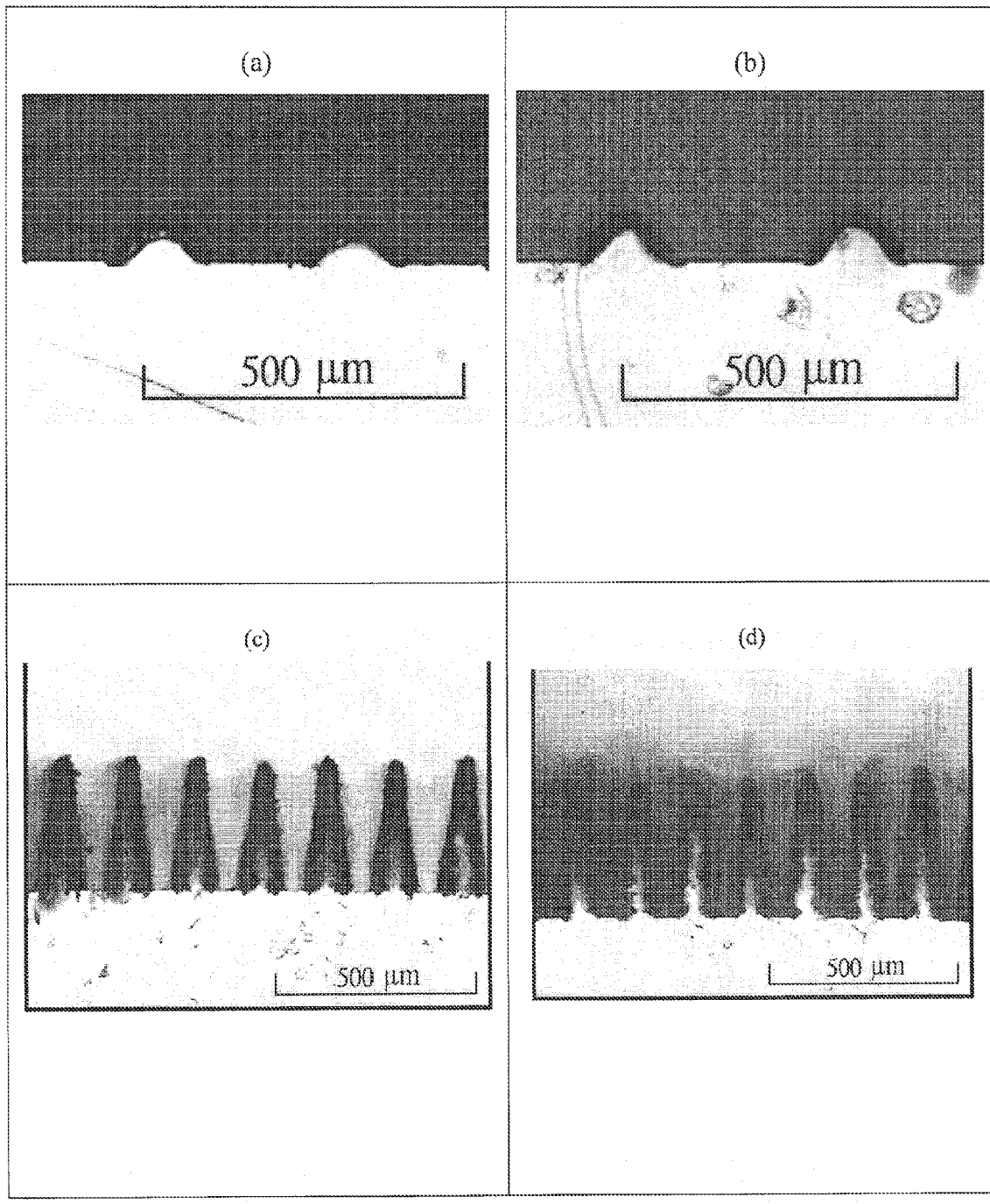
FIGS. 4(a) to 4(d) are microscopic images to illustrate various tilt angles of microstructures formed by various output power of a carbon dioxide laser beam and various through holes of a metallic mask.

According to the experiment result shown in FIG. 4(a), it's learned that under the condition that the speed of the carbon dioxide laser beam (34) is at 34.2 mm/s, the output energy of the carbon dioxide laser beam (34) is in 0.5 W and the size of the through holes (331) is in 50 μm, a tilt angle (324) of 29 degrees is formed in the cavity (322). Further according to the experiment result shown in FIG. 4(b), it's learned that under the condition the same as FIG. 4(a) except that the size of the through holes (331) is in 70 μm, a tilt angle (324) of 45 degrees is formed in the cavity (322). Further according to the experiment result shown in FIG. 4(c), it's learned that under the condition the same as FIG. 4(b) except that the output energy of the carbon dioxide laser beam (34) is in 1.5 W, a tilt angle (324) of 81 degrees is formed in the cavity (322). Further according to the experiment result shown in FIG. 4(d), it's learned that under the condition the same as FIG. 4(a) except that the output energy of the carbon dioxide laser beam (34) is in 1.5 W, a tilt angle (324) of 82 degrees is formed in the cavity (322).

A tilt angle (123) of the microstructure (12) is equal to the tilt angle (324) of the cavity (322), which suggests that the tilt angle (123) of the microstructure (12) and the tilt angle (324) of the cavity (322) are in a range from 20 to 85 degrees. It's will be seen from the foregoing experiment results that a tilt angle (324) of the cavity (322) which is in a range from 20 to 85 degrees is produced by the method of the invention, and the tilt angle (324) of the cavity (322) and a tilt angle (123) of the microstructure (12) can be adjusted by output energy and speed of the carbon dioxide laser beam (34).

Figure 5:
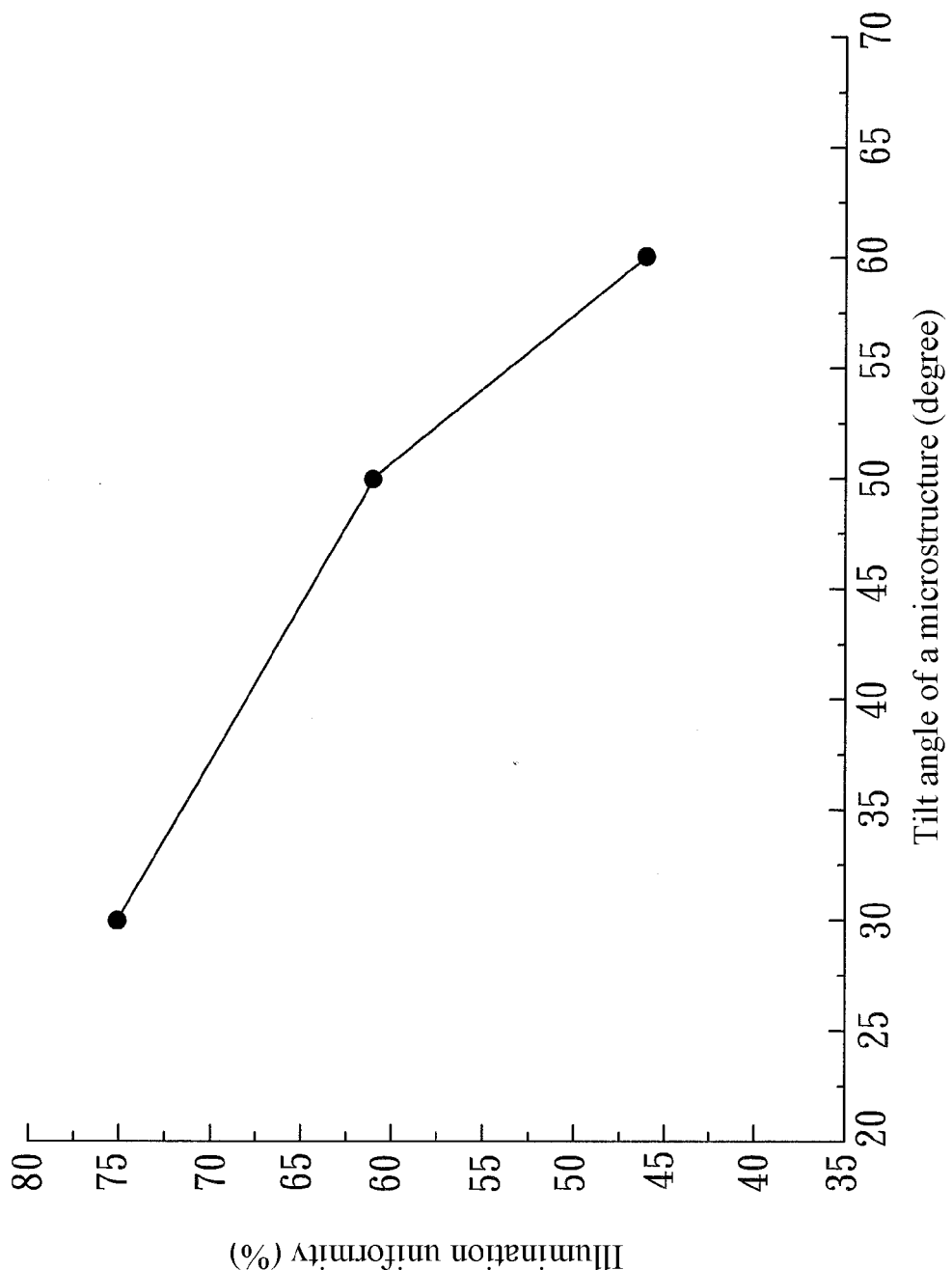
FIG. 5 is a plot to illustrate the relationship between a tilt angle and illumination uniformity of a flexible optical plate which has microstructures dotted thereon, but not dotted in the best way, and each having a size less than 100 µm.

As shown in FIG. 5, it's learned that the different tilt angles (123) of the microstructures (12) have an obvious effect on illumination uniformity of the flexible optical plate (1), and further the illumination uniformity can reach a maximum of 75% when the microstructures (12) are not dotted in the best way. Thus the invention can enhance the illumination uniformity by adjusting the tilt angle (123) of the microstructure (12). It's noticeable that a commercial optical plate has illumination uniformity in a range from 75% to 85% and the flexible optical plate (1) manufactured by the method in accordance with the invention reaches the commercial demand. Although the flexible optical plate (1) in accordance with the invention is employed as a light guiding plate, any flexible optical plate having microstructures on its surface is also manufactured by the method in accordance with the invention when in practical applications.

It's further noticeable that since the metallic mask (33) has a good heat conductivity, heat that the metallic mask (33) provides with the mother substrate (32) is dissipated and the carbon dioxide laser beam (34) is absorbed or reflected by the metallic mask (33) so as to prevent the surface (321) of the mother substrate (32) from heat-affected zone formation and the cavities (322) from forming bulges and splashes. Therefore, the transparent surface (111) and the microstructures (12) of the flexible optical plate (1) in accordance with the invention form a plane outline. Moreover, the carbon dioxide laser beam (34) has an advantage of low cost. In sum, the method indeed provides a method for manufacturing a flexible optical plate (1), the flexible optical plate (1) has microstructures (12) each having a size less than 100 μm and is useful in application of an electronic product, and the method has advantages that it is simple, costs low, adjusts the tilt angle (123) of the microstructure (12) and reduces destructive effect on the flexible optical plate (1).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for manufacturing a flexible optical plate, comprising:
    (A) positioning a metallic mask on a surface of a mother substrate;
    (B) irradiating a carbon dioxide laser beam through the metallic mask to form cavities on the surface of the mother substrate;
    (C) coating a polymer material on the surface of the mother substrate to fill the cavities; and
    (D) drying the coated polymer material to form the flexible optical plate, the flexible optical plate having a substrate on the surface of the mother substrate and microstructures protruding from the substrate and each corresponding to one of the cavities.

2. The method as claimed in claim 1, wherein each of the cavities has a size less than 100 μm.

3. The method as claimed in claim 1, wherein the mother substrate is made of a polymer material or a brittle nonsilicon material.

4. The method as claimed in claim 1, wherein the mother substrate is made of polymethyl methacrylate.

5. The method as claimed in claim 1, wherein the coated polymer is made of polydimethylsiloxane or parylene.

* * * * *